United States Patent [19]

Naito et al.

[11] 3,860,574

[45] Jan. 14, 1975

[54] DERIVATIVES OF NEOMYCIN B AND NEOMYCIN C

[75] Inventors: Takayuki Naito; Susumu Nakagawa; Masahisa Oka, all of Tokyo, Japan

[73] Assignee: Bristol-Myers Company, New York, N.Y.

[22] Filed: June 27, 1973

[21] Appl. No.: 374,191

Related U.S. Application Data

[63] Continuation-in-part of Ser. No. 312,452, Dec. 6, 1972, abandoned.

[52] U.S. Cl..... 260/210 NE, 260/210 AB, 424/180, 424/181
[51] Int. Cl............................................ C07c 95/04
[58] Field of Search................ 260/210 AB, 210 NE

[56] References Cited

UNITED STATES PATENTS

| | | |
|---|---|---|
| 3,282,783 | 11/1966 | Vanderhaeghe.............. 260/210 NE |
| 3,669,838 | 6/1972 | Shier et al...................... 260/210 R |
| 3,781,268 | 12/1973 | Kawaguchi et al........... 260/210 AB |

*Primary Examiner*—Johnnie R. Brown
*Attorney, Agent, or Firm*—Robert E. Havranek

[57] ABSTRACT

Derivatives of neomycin B and C have been prepared which possess substantially improved antibacterial activity. An example of such an agent is 1-[L-(−)-γ-amino-α-hydroxybutyryl]-neomycin B [IVa, BB-K77].

13 Claims, No Drawings

DERIVATIVES OF NEOMYCIN B AND NEOMYCIN C

CROSS-REFERENCE TO RELATED APPLICATION

This application is a continuation-in-part of copending application Ser. No. 312,452, filed Dec. 6, 1972, now abandoned.

BACKGROUND OF THE INVENTION

1. Field of the Invention

This invention relates to semisynthetic 1-substituted derivatives of neomycin B and C, said compounds being prepared by acylating the 1-amino-function of neomycin B and C with a γ-amino-α-hydroxylbutyryl, β-amino-α-hydroxypropionyl and β-amino-α-hydroxyvaleryl moieties.

2. Description of the Prior Art

The neomycins are known antibiotics described in Merck Index, 8th Edition, pp. 723–724. The compounds are fermented as a complex from which neomycin A, B and C have been isolated.

Neomycin B is a compound having the formula

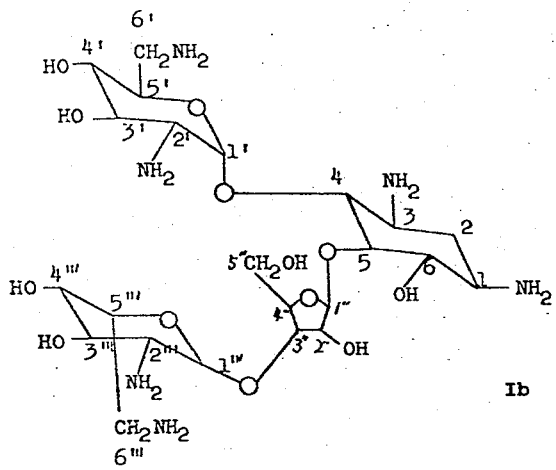

Ib

Neomycin C is a compound having the formula

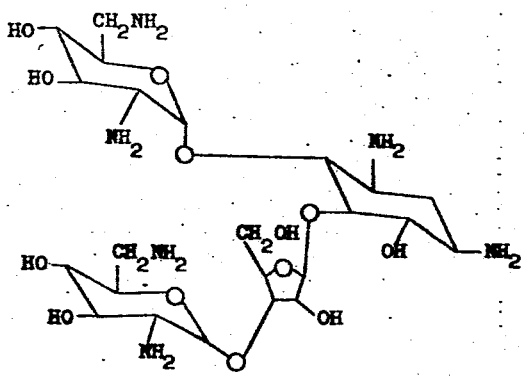

Ic

SUMMARY OF THE INVENTION

The compound having the formula

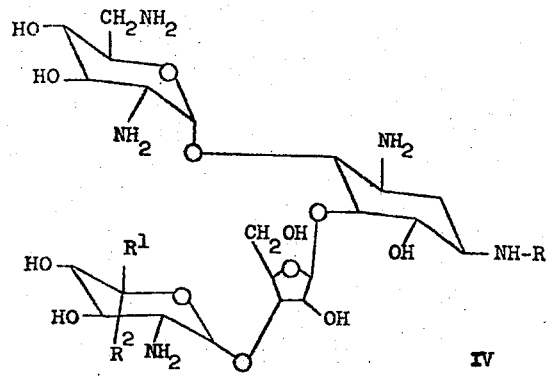

IV in which either $R^1$ or $R^2$ is —$CH_2NH_2$ and the other is hydrogen, in which R is L-(—)-γ-amino-α-hydroxybutyryl, L-(—)-β-amino-α-hydroxypropionyl or L-(—)-δ-amino-α-hydroxyvaleryl; or a nontoxic pharmaceutically acceptable acid addition salt thereof is a valuable antibacterial agent.

This invention relates to semi-synthetic derivatives of neomycin B or C, said compounds being known as 1-[L-(—)-γ-amino-α-hydroxybutyryl] neomycin B or C (IVb or IVc), 1-[L-(—)-β-amino-α-hydroxypropionyl] neomycin B or C (IVd or IVe) or 1-[L-(—)-δ-amino-α-hydroxyvaleryl] neomycin B or C (IVf or IVg) and having the formula

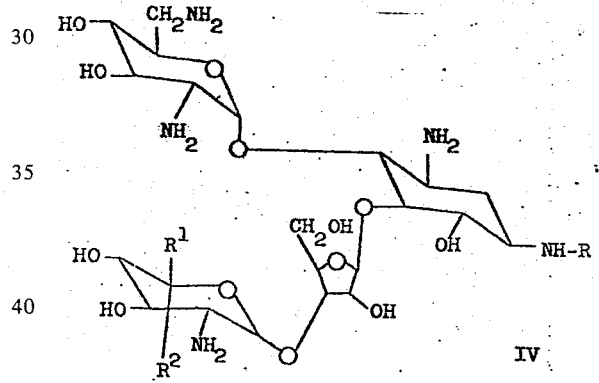

IV in which either $R^1$ or $R^2$ is —$CH_2NH_2$ and the other is hydrogen, R is L-(—)-γ-amino-α-hydroxybutyryl, L-(—)-β-amino-α-hydroxypropionyl or L-(—)-δ-amino-α-hydroxyvaleryl; or a nontoxic pharmaceutically acceptable acid addition salt thereof.

For the purpose of this disclosure, the term "nontoxic pharmaceutically acceptable acid addition salt" shall mean a mono, di-, tri, tetra, penta or hexasalt formed by the interaction of one molecule of compound IV with 1–6 moles of a nontoxic, pharmaceutically acceptable acid. Included among these acids are acetic, hydrochloric, sulfuric, maleic, phosphoric, nitric, hydrobromic, ascorbic, malic and citric acid, and those other acids commonly used to make salts of amine containing pharmaceuticals.

The compounds of the present invention are prepared by the following representative diagramatic scheme:

1.) Neomycin B or C  $\xrightarrow{\text{N-(Benzyloxycarbonyloxy) Succinimide}}$
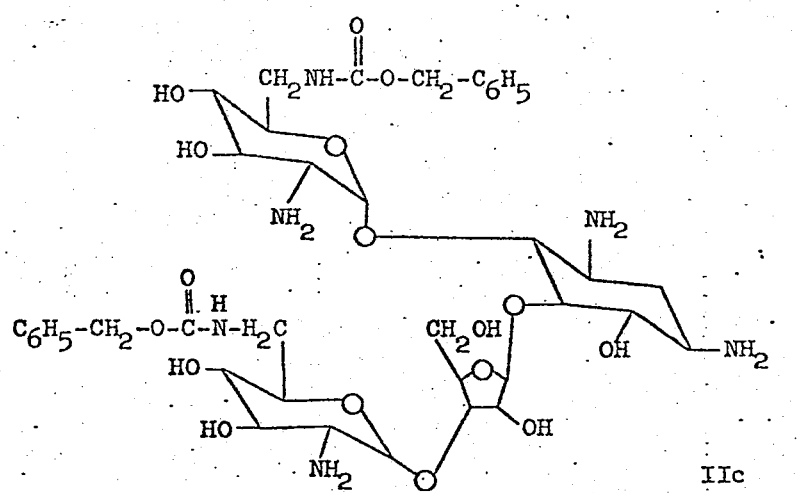
IIc
or
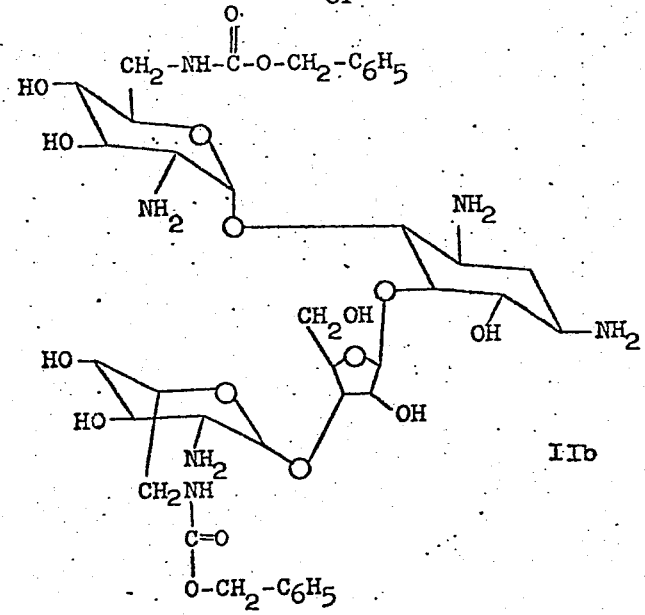
IIb
2.) Compound IIb or IIc  $\xrightarrow{\text{N-Hydroxysuccinimide ester of L-(-)-}\gamma\text{-benzyloxycarbonylamino-}\alpha\text{-hydroxybutyric acid}}$
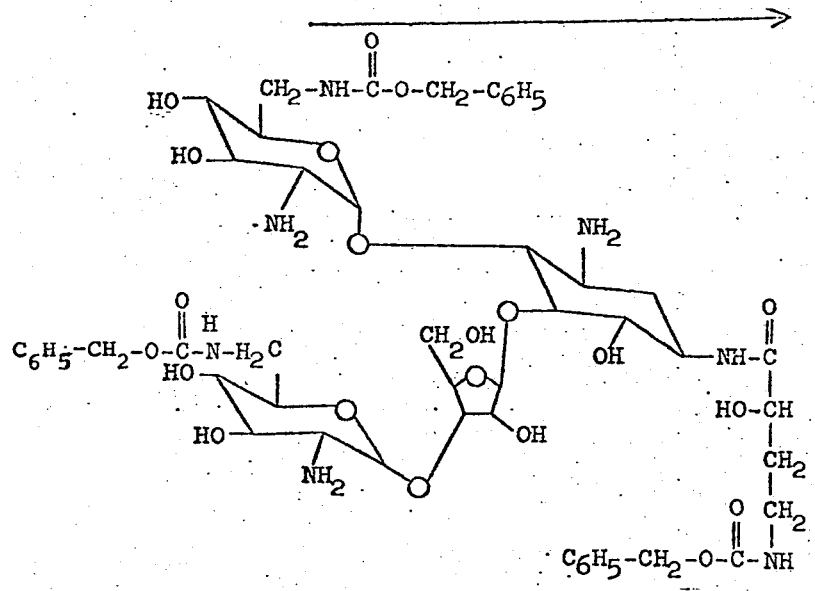
IIIc or
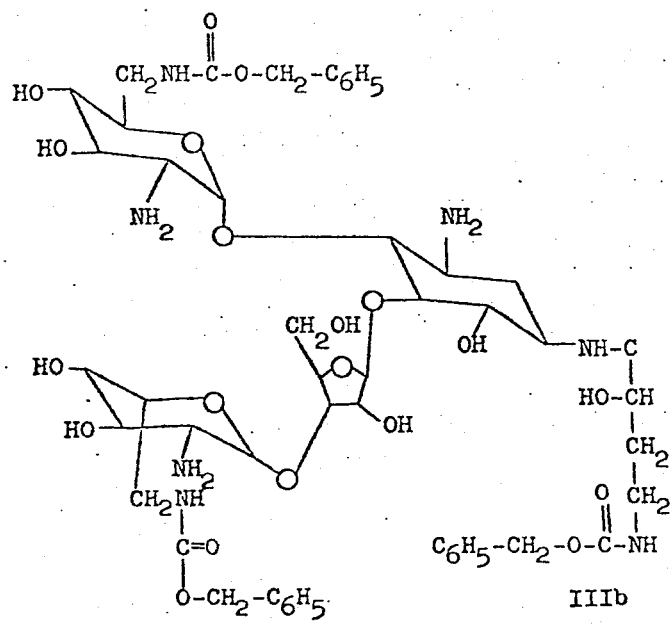
IIIb
3.) Compound IIIb or IIIc 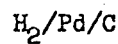 $H_2/Pd/C$
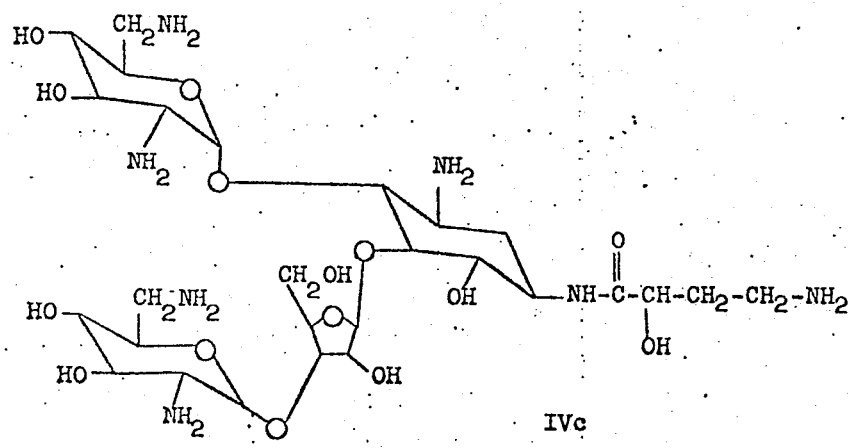
IVc
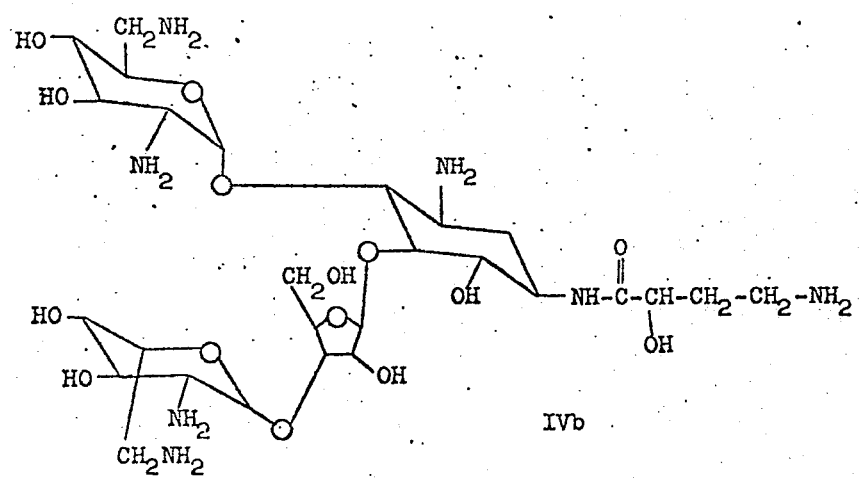
IVb A preferred embodiment of the present invention is the compounds having the formula

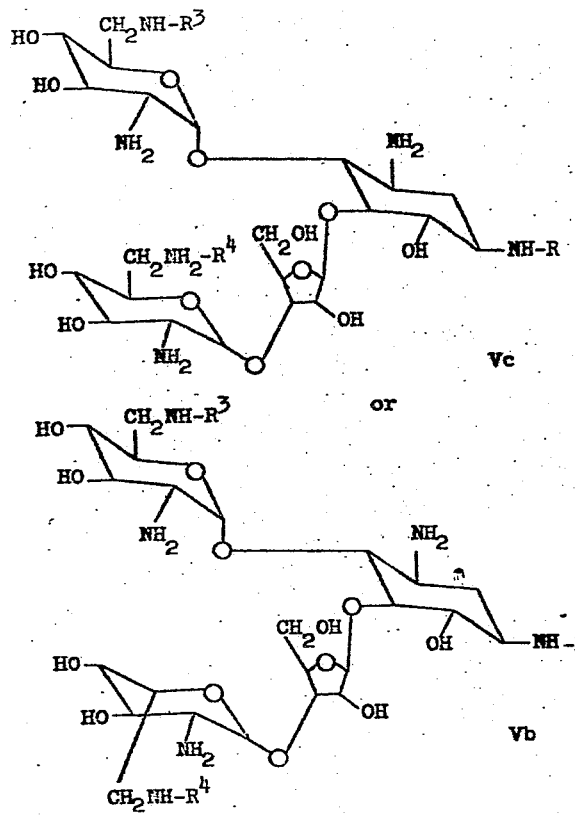

wherein both $R^3$ and $R^4$ are H or

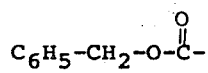

and R is H, L-(−)-γ-amino-α-hydroxybutyryl, L-(−)-β-amino-α-hydroxypropionyl, L-(−)-δ-amino-α-hydroxyvaleryl, L-(−)-γ-benzyloxycarbonylamino-α-hydroxybutyryl, L-(−)-β-benzyloxycarbonyl-amino-α-hydroxypropionyl, or L-(−)-β-benzyloxycarbonylamino-α-hydroxyvaleryl; wherein $R^3$ and $R^4$ or R must be other than H; or a nontoxic pharmaceutically acceptable acid addition salt thereof.

Another preferred embodiment is the compound of formula V in which $R^3$ and $R^4$ are

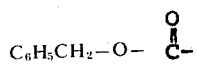

and R is H.

A most preferred embodiment is the compound of formula V wherein $R^3$ and $R^4$ are H and R is L-(−)-γ-amino-α-hydroxybutyryl; or a nontoxic pharmaceutically acceptable acid addition salt thereof.

A most preferred embodiment is the compound of formula V wherein $R^3$ and $R^4$ are H and R is L-(−)-β-amino-α-hydroxypropionyl; or a nontoxic pharmaceutically acceptable acid addition salt thereof.

A most preferred embodiment is the compound of formula V wherein $R^3$ and $R^4$ are H and R is L-(−)-δ-amino-α-hydroxyvaleryl; or a nontoxic pharmaceutically acceptable acid addition salt thereof.

Other most preferred embodiments are the sulfate, hydrochloride, acetate, maleate, citrate, ascorbate, nitrate or phosphate salts of compound V.

Another most preferred embodiment is the mono and disulfate salts of compound V.

The objectives of the present invention have been achieved, by the provision according to the present invention of the process for the preparation of the compound having the formula

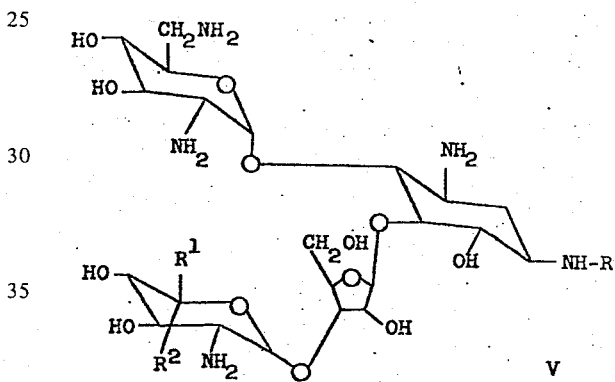

in which either $R^1$ or $R^2$ is -CH$_2$NH$_2$ and the other is hydrogen, in which R is L-(−)-γ-amino-α-hydroxybutyryl, L-(−)-β-amino-α-hydroxypropionyl or L-(−)-δ-amino-α-hydroxyvaleryl; or a nontoxic pharmaceutically acceptable acid addition salt thereof; which process comprises the consecutive steps of A. acylating neomycin B or neomycin C with an acylating agent selected from the compounds having the formulas

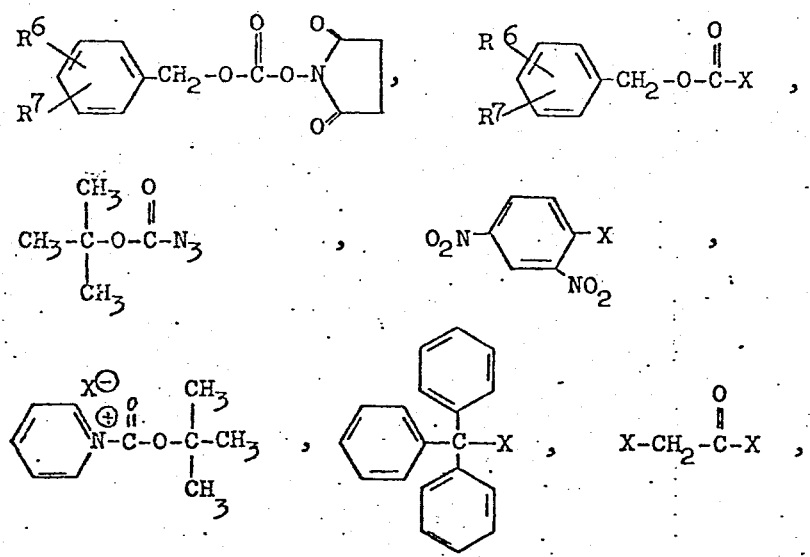

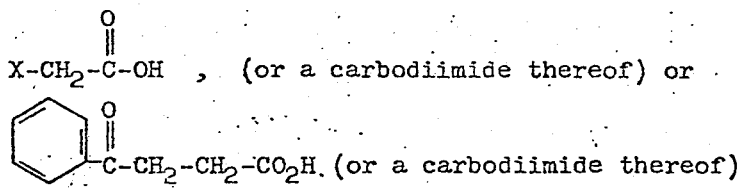, (or a carbodiimide thereof) or

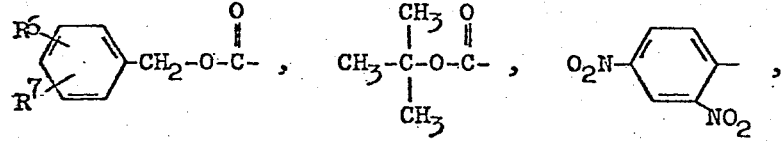, (or a carbodiimide thereof), in which $R^6$ and $R^7$ are alike or different and each is H, F. Cl, Br, $NO_2$, OH, (lower)alkyl or (lower) alkoxy, X is chloro, bromo or iodo, or a functional equivalent as an acylating agent; in a ratio of two moles or less of acylating agent per mole of neomycin B or C in a solvent, preferably selected from the group comprised of dimethylformamide, dimethylacetamide, tetrahydrofuran, dioxane, 1,2-dimethoxyethane, methanol, ethanol, water, acetone, pyridine, N-(lower)-alkylpiperidine, or mixtures thereof, but preferably 1:1 water-tetrahydrofuran at a temperature below 50° C. and preferably below 25° C., to produce the compound having the formula

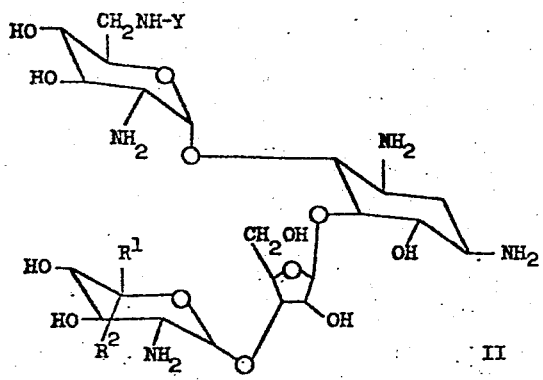

in which either $R^1$ or $R^2$ is -$CH_2$-NH-Y and the other is H, wherein Y is a radical of the formula

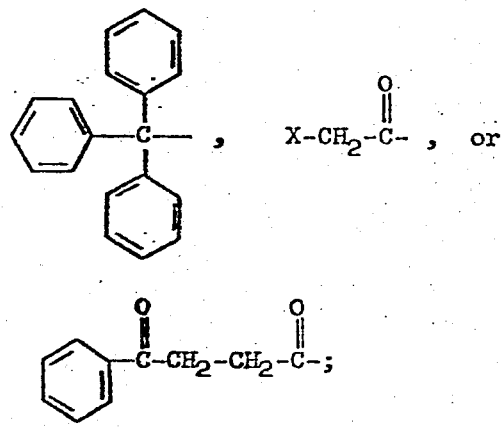

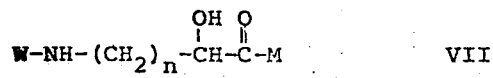

in which $R^6$ and $R^7$ are as defined above;

B. acylating compound II with an acylating agent having the formula $$W-NH-(CH_2)_n-\underset{OH}{\underset{|}{CH}}-\underset{O}{\overset{\|}{C}}-M \qquad VII$$

in which $n$ is an integer of 1 to 3 inclusive and W is a radical selected from the group consisting of

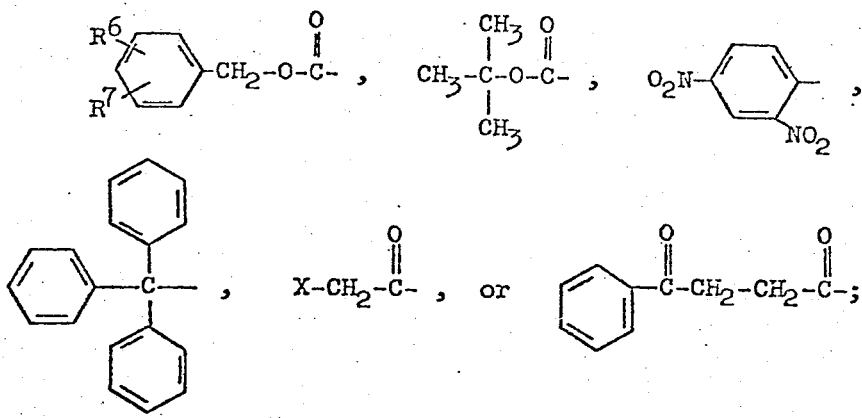

but preferably , M is a radical selected from the group comprising

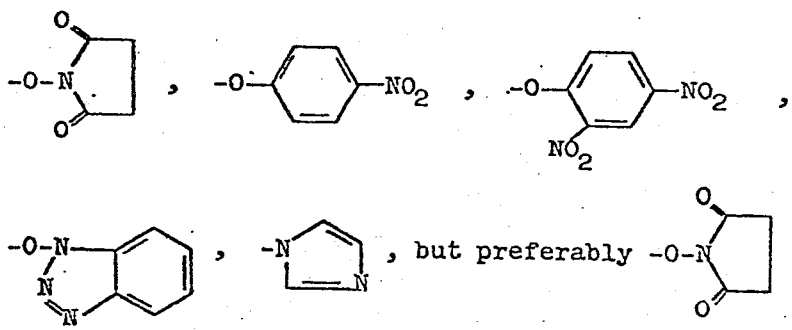

in which $R^6$ and $R^7$ are as above; in a ratio of at least 0.5 mole of compound VII per mole of compound II, but preferably in a ratio of about 0.5 to about 1.4, and most preferably in a ratio of about 0.8 to about 1.1, in a solvent preferably selected from the group comprising a mixture of water and ethyleneglycol dimethyl ether, dioxane, dimethylacetamide, dimethylformamide, tetrahydrofuran, propyleneglycol dimethyl ether, or the like but preferably 1:1 water tetrahydrofuran to produce a compound of the formula

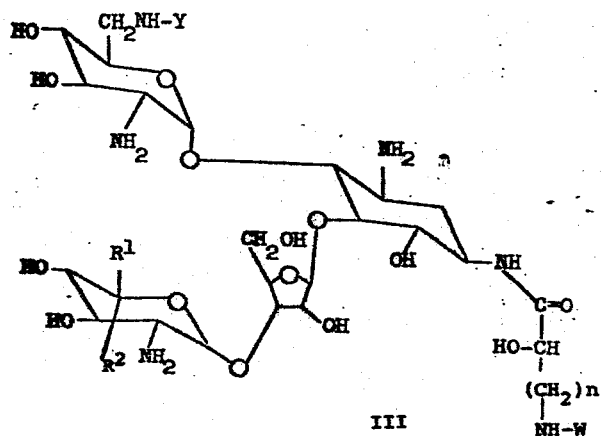

in which either $R^1$ or $R^2$ is $-CH_2-NH-Y$ and the other is H, and n, Y and W are as defined above; and C. removing the blocking groups W and Y from compound III by methods commonly known in the art, and preferably when W and Y are radicals of the formula

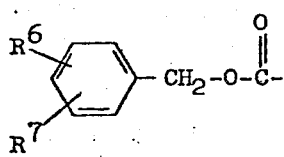

by hydrogenating compound III with hydrogen in the presence of a metal catalyst, preferable selected from the group comprising palladium, platinum, Raney nickel, rhodium, ruthenium, and nickel, but preferably palladium, and most preferably palladium on charcoal, in a water-water miscible solvent system, preferably selected from the group comprising water and dioxane, tetrahydrofuran, ethyleneglycol dimethyl ether, propyleneglycol dimethyl ether, or the like, but preferably 1:1 water-tetrahydrofuran to produce the compound of formula V.

It should be apparent to those knowledgeable in the art that other agents can be used in the process above to acylate the amine functions of the intermediate compounds of the instant invention. This disclosure is meant to include all such acylating agents that produce labile amine blocking groups, said labile blocking groups commonly employed in synthesis of peptides. The labile blocking groups must be readily removable by methods commonly known in the art. Examples of said labile blocking groups and their removal can be found in the review of A. Kapoor, J. Pharm. Sciences 59, pp. 1–27 (1970). Functional equivalents as acylating agent for primary amine groups would include corresponding carboxylic chlorides, bromides, acid anhydrides, including mixed anhydrides and particularly the mixed anhydrides prepared from stronger acids such as the lower aliphatic monoesters of carbonic acid, of alkyl and aryl sulfonic acids and of more hindered acids such as diphenylacetic acid. In addition, an acid azide or an active ester of thioester (e.g., with p-nitrophenol, 2,4-dinitrophenol, thiophenol, thioacetic acid) may be used or the free acid itself may be coupled with the neomycin derivative (II) after first reacting said free acid with N,N'-dimethylchloroforminium chloride [cf. Great Britain 1,008,170 and Novak and Weichet, Experientia XXI/6, 360 (1965) or by the use of enzymes or of an N,N'-carbonyldiimidazole or an N,N'-carbonylditriazole [cf. R. Buijile and H. G. Viehe, Angew, Chem., International Edition 3, 582 (1964)], or of a ketenimine reagent [cf. C. L. Stevens and M. E. Monk, J. Amer. Chem. Soc. 80, 4065 (1958)] or of an isoxazolium salt reagent [cf. R. B. Woodward, R. A. Olofson and H. Mayer, J. Amer. Chem. Soc., 83, 1010 (1961)]. Another equivalent of the acid chloride is a corresponding azolide, i.e., an amide of the corresponding acid whose amide nitrogen is a member of a quasiaromatic five membered ring containing at least two nitrogen atoms, i.e., imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, imidazole, precipitates and may be separate and the imidazolide isolated, but this is not essential. These reactions are well-known in the art [cf. U.S. Pat. Nos. 3,079,315, 3,117,126 and 3,129,224 and British Pat. Nos. 932,644, 957,570 and 959,054).

Compounds IVb and IVc, 1-[L-(−)-γ-amino-α-hydroxybutyryl)]-neomycin B (BB-K77) and 1-[L-(−)-γ-amino-α-hydroxybutyryl]-neomycin C (BB-K88) respectively, possess excellent antibacterial activity that appears comparable or superior to their parents, neomycin B and C, respectively, against a wide spectrum of micro-organisms. Table I is illustrative of their comparative antibiotic activity.

Table I

In vitro Antimicrobial Activities of
L-HABA Derivatives of Neomycins B and C

| MIC (mcg./ml.) | | BB-K77 | Neomycin B | BB-K88 | Neomycin C |
|---|---|---|---|---|---|
| *E. coli* NIHJ | | 3.1 | 1.6 | 6.3 | 3.1 |
| do. | Juhl A15119 | 3.1 | 1.6 | 6.3 | 3.1 |
| do. | A15169 | 3.1 | 1.6 | 6.3 | 3.1 |
| do. | KM-R* A20363 | 3.1 | 100 | 12.5 | >50 |
| do. | A9844 | 3.1 | 1.6 | 6.3 | 3.1 |
| do. | KM-R* A20365 | 0.8 | 12.5 | 1.6 | >50 |
| do. | K-12 A9632 | 1.6 | 0.8 | 3.1 | 3.1 |
| do. | KM-R* A20664 | 1.6 | 0.8 | 12.5 | 6.3 |
| do. | KM-R* A20665 | 1.6 | 25 | 3.1 | >50 |
| do. | W677 A20684 | 1.6 | 0.8 | 6.3 | 3.1 |
| do. | JR/W677 A20683 | 50 | 100 | >50 | >50 |
| *K. pneumoniae* | D-11 | 0.4 | 0.4 | 0.8 | 0.4 |
| do. | Type 22 A20680 | 100 | 100 | >50 | >50 |
| *Ser. marcescens* | A20019 | 6.3 | 3.1 | 6.3 | 3.1 |
| *Ps. aeruginosa* | D-15 | 3.1 | 25 | 12.5 | 50 |
| do. | H9 D-113 KM-R* | >100 | >100 | >50 | >50 |
| do. | A9923 | 12.5 | 100 | 50 | >50 |
| do. | A9930 | 1.6 | 1.6 | 3.1 | 50 |
| do. | A15150 | 100 | 100 | >50 | >50 |
| do. | A15194 | 12.5 | 100 | 25 | >50 |
| do. | GM-R** A20717 | 50 | 100 | 50 | >50 |
| do. | GM-R** A20718 | 100 | 100 | 50 | >50 |
| *Ps.*H6 D-114 NM-R**** | | 12.5 | 100 | 12.5 | >50 |
| *Pr. vulgaris* | A9436 | 1.6 | 0.8 | 3.1 | 3.1 |
| do. | A9526 | 1.6 | 0.4 | 3.1 | 3.1 |
| *Pr. mirabilis* | A9554 | 3.1 | 3.1 | 12.5 | 6.3 |
| do. | A9900 | 3.1 | 1.6 | 12.5 | 3.1 |
| *Pr. morganii* | A9553 | 3.1 | 1.6 | 6.3 | 3.1 |
| do. | A20031 | 6.3 | 1.6 | 12.5 | 6.3 |
| *S. aureus* Smith | A15167 | 0.8 | 0.2 | 0.8 | 0.8 |
| do. | 209P SM-R*** | 3.1 | 1.6 | 12.5 | 3.1 |
| do. | KM-R* A20239 | 3.1 | 50 | 12.5 | >50 |

Table I – Continued

In vitro Antimicrobial Activities of L-HABA Derivatives of Neomycins B and C

| MIC (mcg./ml.) | | BB-K77 | Neomycin B | BB-K88 | Neomycin C |
|---|---|---|---|---|---|
| Mycob. 607 | | 1.6 | 0.8 | 1.6 | 3.1 |
| do. | KM-R* | >100 | >100 | >50 | >50 |
| do. | KM*,SM-R*** | >100 | >100 | >50 | >50 |
| do. | phlei | 0.4 | 0.4 | 0.8 | 1.6 |
| do. | ranae | 0.8 | 0.8 | 1.6 | 3.1 |

KM-R* is a kanamycin A resistant organism.
GM-R** is a gentamicin resistant organism.
SM-R*** is a streptomycin resistant organism.
NM-R**** is a neomycin resistant organism.

Compounds IV$d$ (BB-K116), IV$e$ (BB-K119), IV$f$ (BB-K113) and IV$g$ (BB-K132) were also assayed in vitro as compared to compounds IV$b$, IV$c$ and neomycin B and C as shown below:

Compounds IV$b$ and IV$c$ generally appear more potent against the test organisms than either IV$d$, IV$e$, IV$f$ or IV$g$ but all are still potent antimicrobial agents.

Compounds IV are valuable as anti-bacterial agents, nutritional supplements in animal feeds, therapeutic agents in poultry and animals, including man, and are especially valuable in the treatment of infectious diseases caused by Gram-positive and Gram-negative bacteria.

Compounds IV when administered orally are useful as an adjunctive treatment for preoperative sterilization of the bowel. Both aerobic and anaerobic flora which are susceptible to these drugs are reduced in the large intestine. When accompanied by adequate mechanical cleansing, they are useful in preparing for colonic surgery.

Compounds IV are effective in the treatment of systemic bacterial infections when administered parenterally in the dosage range of about 250 mg. to about 3000 mg. per day in divided doses three or four times a day. Generally the compounds are effective when administered at a dosage of about 5.0 to 7.5 mg./kg. of body weight every 12 hours.

Compounds of formula IV and the salts thereof are known to form mono- and polyhydrates upon isolation from aqueous solvents. Accordingly, the hydrates so produced are considered an integral part of the instant invention.

Neomycin B and C both possess six amino moieties that are capable of acylation in the process for the preparation of the compounds of the instant invention. As such, it is not unusual to recover neomycin B and C derivatives other than those claimed from the process (see example 4).

PREPARATION OF NEOMYCIN B AND C

Neomycins B and C were isolated by column chromatography of crude neomycin complex using Dowex 1-X2 according to the procedure of H. Maeher and C. P. Schaffner, Anal. Chem., 36 105 (1964).

Dowex 1-X2 is a resin comprised of a polystyrene backbone to which is attached benzyltrimethylammonium chloride and 2% of added divinylbenzene as a cross-linking agent during polymerization of the polystyrene. It is supplied as beads.

EXAMPLE 1

Preparation of L-(−)-γ-Benzyloxycarbonylamino-α-hydroxybutyric Acid (VI$a$)

L-(−)-γ-amino-α-hydroxybutyric acid (7.4 g., 0.062 mole) was added to a solution of 5.2 g (0.13 mole) of sodium hydroxide in 50 ml. of water. To the stirred solution was added dropwise at 0°–5° C. over a period of 0.5 hour, 11.7 g. (0.068 mole) of carbobenzoxy chloride and the mixture was continued to stir for one hour at the same temperature. The reaction mixture was washed with 50 ml. of ether, adjusted to pH 2 with dilute hydrochloric acid and extracted with four 80-ml. portions of ether. The ethereal extracts were combined, washed with a small amount of saturated sodium chloride solution, dried with anhydrous sodium sulfate and filtered. The filtrate was evaporated in vacuo and the resulting residue was crystallized from benzene to give 11.6 g. (74%) of colorless plates; melting point 78.5°–79.5° C., $[\alpha]_D = -4.5°$ ($c=2$, $CH_3OH$). Infrared (IR) [KBr] : IR(KBr)$\gamma_{c=o}$ 1740, 1690 cm$^{-1}$. Nuclear Magnetic Resonance (NMR) (acetone-d$_6$) δ (in ppm from TMS) 2.0 (2H,m), 3.29 (2H,d—d, J=6.7 and 12 Hz), 4.16 (1H,d—d, J=4.5 and 8 Hz), 4.99 (2H,s), 6.2 (2H, broad), 7.21 (5H,s).

Anal. calc'd. for $C_{12}H_{15}NO_5$: C, 56.91; H, 5.97; N, 5.53. Found: C, 56.66; H, 5.97; N, 5.47

EXAMPLE 2

N-Hydroxysuccinimide ester of L-(−)-γ-benzyloxycarbonylamino-α-hydroxybutyric Acid (VII$a$)

A solution of 10.6 g. (0.042 mole) of VI$a$ and 4.8 g. (0.042 mole) of N-hydroxysuccinimide[1] in 200 ml. of ethyl acetate was cooled to 0° C. and then 8.6 g. (0.042 mole) of dicyclohexylcarbodiimide was added. The mixture was kept overnight in a refrigerator. The dicyclohexylurea which separated was filtered off and the filtrate was concentrated to about 50 ml. under reduced pressure to give colorless crystals of VII$a$ which were collected by filtration; 6.4 g., m.p. 121°–122.5° C. The filtrate was evaporated to dryness in vacuo and the crystalline residue was washed with 20 ml. of a benzene-n-hexane mixture to give an additional amount of VII$a$. The total yield was 13.4 g. (92%). $[\alpha]_D$ 1.5° ($c=2$, CHCl$_3$) IR(KBr) $\gamma_{c=o}$ 1810, 1755, 1740, 1680 cm$^{-1}$. NMR (acetone-d$_6$) δ(in ppm from TMS) 2.0 (2H,m), 2.83 (4H,s), 3.37(2H,d—d, J=6.5 and 12.5 Hz), 4.56(1H,m), 4.99(2H,s), 6.3(1H,broad), 7.23 (5H,s).
(1. G. W. Anderson et al., H. Am. Chem. Soc., 86, 1839, (1964).)

Anal. calc'd. for $C_{16}H_{18}N_2O_7$: C, 54.85; H, 5.18; N, 8.00.

Found: C, 54.79, 54.70; H, 5.21, 5.20; N, 8.14, 8.12.

EXAMPLE 3

Preparation of 6',6'''-Dibenzyloxycarbonylneomycin B (IIb)

To a stirred solution of 4.0 g. (6.5 m mole) of neomycin B in 200 ml. of 50% aqueous THF (tetrahydrofuran) was added 2.74 g. (11 m. mole) of N-benzyloxycarbonyloxysuccinimide at 5°–10° C. The reaction mixture was stirred overnight at room temperature and evaporated in vacuo to remove the organic solvent. The aqueous solution was diluted with 100 ml. of water, washed with two 50-ml. portions of n-BuOH and stirred with 10 ml. of CG-50 ($NH_4^+$ form) for two hours. The resin was collected by filtration, washed with deionized water and placed on the top of a column of CG-50 ion exchanger ($NH_4^+$ form, 80 ml.), which was eluted successively with each one of 0.05 N $NH_4OH$, 0.1 N $NH_4OH$, 0.2 N $NH_4OH$ and 0.3 N $NH_4OH$. The eluate was collected in 20-ml. fraction and monitored by ninhydrin test and TLC (thin layer chromatography) on silica gel plate (solvent system: MeOAc-n-PrOH-concentrate $NH_4OH$=45:105:60). Fractions 125 to 136 which showed a ninhydrin spot at Rf 0.49 were combined, concentrated in vacuo and freeze-dried to give 550 mg. (10%) of the desired product. m.p. 156°–158° C.; IR (infrared spectrum) (KBr) 3360, 1700, 1530 $cm^{-1}$; NMR (nuclear magnetic resonance spectra) (DMSO–$d_6$+$D_2O$) 4.70 (m, 1H), 4.97 (s, 4H) 5.05 (m,2H), 7.22 (s,10H).

EXAMPLE 4

Preparation of
1[L-(−)-γ-amino-α-hydroxybutyryl]-neomycin B (IVb)

To a stirred solution of 500 mg. (0.566 m.mole) of 6',6'''-dibenzyloxycarbonylneomycin B in 20 ml. of 50% aqueous THF was added in one portion 180 mg. (0.566 m.mole) of N-hydroxysuccinimide ester of L-(−)-γ-amino-α-hydroxybutyric acid. The reaction mixture was stirred overnight at room temperature and hydrogenated with 1 g. of 10% palladium on charcoal for 3 hours at 50 psi. After removing the catalyst, the filtrate was concentrated in vacuo to remove the organic solvent and the concentrate was treated with one ml. of CG-50 ion-exchange resin ($NH_4^+$ form) for 20 minutes. The resin was filtered, washed with water and put on the top of a CG-50 column ($NH_4^+$, 15 ml.). The column was eluted successively with each 500 ml. of 0.1 N, 0.3 N, 0.4 N and 0.5 N $NH_4OH$. The eluate was collected in 10-ml. fraction and grouped into the following cuts based on ninhydrin test, disc assay and TLC on slica gel plate (solvent system: $CHCl_3$—MeOH—concentrated $NH_4OH$—$H_2O$—1:4:2:1). Each cut was evaporated in vacuo and the residue lyophilized.

| Cut | Fraction No. | Eluted with | Wt. isolated | Compound |
|---|---|---|---|---|
| 1 | 130–135 | 0.4 N $NH_4OH$ | 20 mg. | Neomycin B |
| 2 | 191–205 | 0.5 N $NH_4OH$ | 15 | BB-K77 |
| 3 | 223–232 | 0.5 N $NH_4OH$ | 11 | BB-K78 |
| 4 | 240–260 | 0.5 N $NH_4OH$ | 16 | BB-K79 |

| Code No. | M.p. (dec.) | Rf* | $\gamma_{C=O}$ (KBr) |
|---|---|---|---|
| BB-K77 | 181–184° | 0.19 | 1640 $cm^{-1}$ |
| BB-K78 | 230 | 0.19 | 1630 |
| BB-K79 | 222 | 0.19 | 1620 |

*TLC: silica gel plate, $CHCl_3$—MeOH—28% $NH_4OH$—$H_2O$ (1:4:2:1)

The fraction BB-K77 was determined to be 1-[L-(−)-γ-amino-α-hydroxybutyryl]-neomycin B, the desired product (IVb).

EXAMPLE 5

Preparation of 6',6'''-Dibenzyloxycarbonyl-neomycin C (IIc)

To a stirred solution of 3.7 g. (6.03 m. mole) of neomycin C in 100 ml. of 50% aqueous THF was added 2.9 g. (12 m.mole) of N-benzyloxycarbonyloxysuccinimide at 5°–10° C. The reaction mixture was stirred overnight at room temperature and evaporated in vacuo to remove the organic solvent. The aqueous solution was diluted with 100 ml. of water washed with two 50-ml. portions of n-BuOH and treated with 7 ml. of CG-50 ($NH_4^+$ form) for two hours. The resin was collected by filtration, washed with deionized water and placed on the top of a CG-50 column ($NH_4^+$ form, 80 ml.), which was eluted successively with each 500 ml. of 0.1 N and 0.2 N $NH_4OH$. The eulate was collected in 10-ml. fraction and monitored by ninhydrin test and TLC on silica gel plate (solvent system: MeOAc-n-PrOH-28% $NH_4OH$=45:105:60). Fractions 74–79 which showed a ninhydrin spot at Rf 0.49 were combined, concentrated in vacuo and lyophilized to give 210 mg. (4%) of the desired product; m.p. 141°–145° C.; IR (KBr) 3350, 1705, 1450 $cm^{-1}$.

EXAMPLE 6

Preparation of
1[L-(−)-γ-amino-α-hydroxybutyryl]-neomycin C (IVc)

To a stirred solution of 200 mg. (0.22 m.mole) of 6',6'''-dibenzyloxycarbonylneomycin C in 20 ml. of 50% aqueous THF was added 77 mg. (0.22 m.mole) of N-hydroxysuccinimide ester of L-(−)-γ-amino-α-hydroxybutyric acid. The reaction mixture was stirred overnight, hydrogenated with 100 mg. of 10% palladium charcoal for six hours at atmospheric pressure and filtered. The filtrate being concentrated in vacuo to remove the organic solvent, the resulting aqueous solution was treated with one ml. of CG-50 ($NH_4^+$ form). The resin was filtered washed with water and placed on the top of a CG-50 column ($NH_4^+$ form, 4 ml.) The column was eluted successively with 200 ml. of 0.1 N $NH_4OH$ and 300 ml. of 0.3 N $NH_4OH$. The eluate was collected in 5-ml. fraction monitored by TLC on silica gel plate and disc assay (test organism: *E. coli* A20665). Fractions 58 to 60 (a ninhydrin spot at Rf 0.37) were combined, evaporated in vacuo and lyophilized to give 7 mg. of neomycin C. Fractions 86 to 89 (a ninhydrin spot at Rf 0.15) gave 2 mg. of the desired product, BB-K88; m.p. 190°–191°C. (dec.); IR (KBr) 3450, 1617, 1580, 1015 $cm^{-1}$.

Amberlite CG-50 is the tradename for the chromatographic grade of a weakly acidic cationic exchange resin of a carboxylic-polymethacrylic type.

EXAMPLE 7

Preparation of N-(Benzyloxycarbonyloxy)succinimide

N-Hydroxysiccinimide[1] (23 g., 0.2 mole) was dissolved in a solution of 9 g. (0.22 mole) of sodium hydroxide in 200 ml. of water. To the stirred solution was added dropwise 34 g. (0.2 mole) of carbobenzoxy chloride with water-cooling and then the mixture was stirred at room temperature overnight to separate the carbobenzoxy derivative which was collected by filtration, washed with water and air-dried. Yield 41.1 g. (82%). Recrystallization from benzene-n-hexane (10:1) gave colorless prisms melting at 78°–79°.

(1. G. W. Anderson et al., J. Am. Chem. Soc., 86, 1839 (1964).

EXAMPLE 8

Preparation of L-(−)-γ-amino-α-hydroxybutyric Acid from Ambutyrosin A or B or mixtures Thereof Ambutyrosin A (5.0 gm.) [U.S. Pat. No. 3,541,078, issued Nov. 17, 1970] was refluxed with 160 ml. of 0.5 N sodium hydroxide for one hour. The hydrolysate was neutralized with 6N HCl and chromatographed on a column of CG-50 ($NH_4^+$ type). The desired L-(−)-γ-amino-α-hydroxybutyric acid was isolated by developing the column with water and removing the water by freeze drying. The L-(−)-γ-amino-α-hydroxy-butyric acid is characterized as a crystalline material having a m.p. of 212.5°–214.5° C. [Column 2, lines 31–38, U.S. Pat. No. 3,541,078].

EXAMPLE 9

Preparation of L-(−)-amino-α-hydroxybutyric Acid from DL-α-hydroxy-γ-phthalimidobutyric Acid A. Dehydroabietylammonium L-α-hydroxy-γ-phthalimidobutyrate To s solution of 25 g. (0.1 mole) of 2-hydroxy-γ-phthalimidobutyric acid[1] in 200 ml. of ethanol was added a solution of 29 g. (0.1 mole) of dehydroabietylamine in 130 ml. of ethanol. The solution was shaken vigorously for a minute and stood at room temperature for five hours during which time fine needles crystallized out. The crystals were collected by filtration, washed with 50 ml. of ethanol and air-dried to obtain 30.1 g. (56%) of a diastereomer of the dehydroabietylamine salt. M.p. 93°–94° C. $[\alpha]_D^{24}$ + 15° (C.2.5, MeOH). Recrystallization from 300 ml of ethanol gave 23.2 g (43%) of the pure product. M.p. 94°–95°C. $[\alpha]_D^{24}$ + 10.8° (C.2.5, MeOH). Further recrystallization did not change the melting point and the specific rotation.

(1. Y. Satio et al, Tetrahedron Letters, 1970, 4863.)

Anal. calc'd. for $C_{32}H_{42}N_2O_5 \cdot H_2O$: C, 69.54; H, 8.02; N, 5.07. Found: C, 69.58; H, 8.08; N, 5.07.

B. L-(−)-γ-amino-α-hydroxybutyric Acid

To a solution of 1.5 g. (0.014 mole) of sodium carbonate in 40 ml. of water were added 5.3 g. (0.01 mole) of dehydroabietylammonium L-α-hydroxy-γ-phthalimidobutyrate and 60 ml. of ether. The mixture was shaken vigorously until all of the solid had dissolved. The ether layer was separated. The aqueous solution was washed twice with 30-ml. portions of ether and evaporated to 15 ml. under reduced pressure. To the concentrate was added 10 ml. of concentrated hydrochloric acid and the mixture was refluxed for ten hours. After cooling, separated phthalic acid was removed by filtration. The filtrate was evaporated under reduced pressure. The residue was dissolved in 10 ml. of water and the solution was evaporated to dryness. This operation was repeated twice to remove excess hydrochloric acid. The residual syrup was dissolved in 10 ml. of water and filtered to remove a small amount of insoluble phthalic acid. The filtrate was adsorbed on a column of IR-120 ($H^+$, 1 cm. × 35 cm.), the solumn was washed with 300 ml. of water and eluted with 1 N ammonium hydroxide solution. The eluate was collected in 15-ml. fraction. The ninhydrin positive fractions 10 to 16 were combined and evaporated under reduced pressure to give a syrup which crystallized gradually. The crystals were triturated with ethanol, filtered and dried in a vacuum desiccator to give 0.78 g. (66%) of L-(−)-γ-amino-α-hydroxybutyric acid. M.p. 206–207° C. $[\alpha]_D^{24}$ −29° (C, 2.5, $H_2O$). The IR spectrum were identical with the authentic sample which was obtained from ambutyrosin.

EXAMPLE 10

Preparation of the Monosulfate Salt of 1-[L-(−)-γ-amino -α-hydroxybutyryl]-neomycin B or C One mole of 1-[L-(−)-γ-amino-α-hydroxybutyryl]-neomycin B or C is dissolved in 1 to 3 liters of water. The solution is filtered to remove any undissolved solids. To the chilled and stirred solution is added one mole of sulfuric acid dissolved in 500 ml. of water. The mixture is allowed to stir for 30 minutes, following which cold ethanol is added to the mixture till precipitation occurs. The solids are collected by filtration and are determined to be the desired monosulfate salt.

EXAMPLE 11

Preparation of the Disulfate Salt of 1-[L-(−)- -amino-α-hydroxybutyryl]-neomycin B or C One mole of 1-[L-(−)-γ-amino-α-hydroxybutyryl]-neomycin B or C is dissolved in 1 to 3 liters of water. The solution is filtered to remove any undissolved solids. To the chilled and stirred solution is added two moles of sulfuric acid dissolved in 100 ml. of water. The mixture is allowed to stir for 30 minutes, following which cold ethanol is added to the mixture until precipitation occurs. The solids are collected by filtration and are determined to be the desired disulfate salt.

EXAMPLE 12

Preparation of L-β-Benzyloxycarbonylamino-α-hydroxypropionic Acid (VIb)

L-β-Amino-α-hydroxypropionic acid* (8.2 g., 0.078 mole) was dissolved in a solution of 6.56 g. (0.0164 mole) of sodium hydroxide and in 60 ml. of water. To the stirred solution was added dropwise 14.7 g. (0.086 mole) of carbobenzoxy chloride below 5° C. The mixture was stirred for an hour at room temperature, washed with 60 ml. of ether and adjusted to pH 2 with dilute HCl. The precipitate was collected by filtration, washed with water and air-dried to give 9.65 g. (52%) of VIb. The filtrate was extracted with five 100-ml. portions of ether. The ethereal solution was washed with water, dried over sodium sulfate and evaporated to dryness in vacuo to give additional 2.0 g. (11%) of VIb. A total of 11.65 g. of VIb. was crystallized from 500 ml. of benzeneethyl acetate (4:1) to give 9.36 g. (50%) of pure VIb. m.p. 128.5°–129.5° C. Infrared (IR) (KBr) : $\gamma_C \approx O$ 1745, 1690 cm$^{-1}$. $[\alpha]_D^{25}$ +2.9° (c5.0, MeOH). Nuclear Magnetic Resonance Spectra ([NMR (DMSO-$d_6$]: δ(in ppm) 3.05–3.45 (2H, m, $CH_2N$), 4.05 (1H, d–d, −O−CH−CO−), 5.03 (2H, s, $CH_2Ar$) 7.18 (1H, broad, NH), 7.36 (5H, s, ring H).

(K. Freudenberg, Ber., 47,2027(1914).) C≈

Anal. calc'd. for $C_{11}H_{13}NO_5$: C, 55.23; H, 5.48; N, 5.86. Found: C, 55.34; H, 5.49; N, 5.87.

EXAMPLE 13

N-Hydroxysuccinimide Ester of L-β-benzyloxycarbonylamino-α-hydroxypropionic Acid (VIIb)

To a chilled and stirred solution of 478 mg. (2 m.moles) of VIb and 230 mg. (2 m.moles) of N-hydroxysuccinimide in 10 ml. of tetrahydrofuran (THF) was added 412 mg. (2 m.moles) of dicyclohexylcarbodiimide. The mixture was stirred for an hour at 0°–5° C., for 2 hours at room temperature and then filtered to remove the N,N'-dicyclohexylurea. The filtrate containing VIIb was used for the next reaction without isolation.

EXAMPLE 14

Preparation of 1-[L-(−)-β-amino-α-hydroxypropionyl]neomycin B (IVd, BB-K116)

To a stirred solution of 2.44 g (2.73 m moles) of 6',6'''-N-dibenzyloxycarbonylneomycin B (IIb) in 60 ml of 33% aqueous tetrahydrofuran (THF) was added a solution of the activated ester (VIIb) in 20 ml of THF prepared from 588 mg (2.46 m moles) of L-β-benzyloxycarbonylamino-α-hydroxypropionic acid. The reaction mixture was stirred overnight and then hydrogenated overnight with 1.1 g of 10% palladium on charcoal in a Parr hydrogenator at 45 psi and room temperature. The catalyst was filtered off and washed with water. The filtrate and washings were evaporated to remove most of the organic solvent. The resulting aqueous solution was passed through a column of amberlite CG-50 ($NH_4^+$,55 ml), which was eluted with 400 ml of water and each 1 L of 0.1 N $NH_4OH$, 0.3 N $NH_4OH$ and 0.5 N $NH_4CH$. The eluate was collected in 20-ml fraction from tube nos 1 to 140 and then in 10-ml fractions, and cut into the following appropriate fractions on the bases of TLC on slica gel plate (S-110, ninhydrin) and disk assay using B. subtilis PCI 219 and P. aeruginosa A 9843. Each fraction was evaporated in vacuo and lyophilized.

| Fraction | Tube No. | $NH_4OH$ | Weight | Identification |
| --- | --- | --- | --- | --- |
| 1 | 70 – 74 | 0.3 N | 206 mg(12%) | neomycin B |
| 2 | 201–202 | 0.5 N | 236 mg(14%) | BB-K 116, the desired compound |
| 3 | 217–224 | 0.5 N | 22 mg (1.4%) | BB-K 117, a position isomer |

Physico-chemical properties:

| Code No. | Mp (dec) | IR (KBr): γC=O | Rf (S110, ninhydrin) |
| --- | --- | --- | --- |
| BB-K 116 | 195–197° | 1640 cm$^{-1}$ | 0.43 |
| BB-K 117 | 201–203° | 1640 cm$^{-1}$ | 0.23 |

Microanalysis of BB-K 116:
Calcd for $C_{26}H_{51}N_7O_{15} \cdot \frac{1}{2}H_2CO_3$:
C, 43.46; H, 7.15; N, 13.38.
Found: C,43.41; H, 7.57; N, 12.88.

Both BB-K 116 and BB-K 117 gave β-amino-α-hydroxypropionic acid and neomycin B on hydrolysis with 0.5 N NaOH at 100°C.

EXAMPLE 15

Preparation of 1-N-[L(−)-β-Amino-α-hydroxypropionyl]neomycin C (IVe, BB-K 119).

To a stirred solution of 2.7 g (3 m moles) of 6',6''-N-dibenzyloxycarbonylineomycin C (IIc) in 60 ml of 33% aqueous THF was added a solution of the activated ester (VIIb) in 20 ml of THF which was prepared from 645 mg (2.7 m moles) of L-β-benzyloxycarbonylamino-α-hydroxypropionic acid. The mixture was stirred overnight and evaporated in vacuo to remove the organic solvent. The resulting aqueous solution was diluted with 50 ml of water and extracted three 100-ml portions of n-butanol. The butanol extracts were evaporated to dryness. The residue was dissolved in 50 ml of 40% aqueous THF. The solution was hydrogenated overnight with 1.1 g of 10% palladium on charcoal in a Parr hydrogenator at 45 psi and room temperature. The catalyst was removed by filtration and washed with water. The filtrate and washings were evaporated in vacuo to remove most of the organic solvent. The resulting aqueous solution was passed through a column of amberlite CG-50 ($NH_4^+$, 55 ml), which was irrigated successively with 400 ml of water, 400 ml of 0.1 N, 1 L of 0.3 N and L L of 0.5 N $NH_4OH$. The eluate was collected in 20-ml fraction and divided into the following appropriate fractions on the bases of TLC on silica gel plate (S-110, ninhydrin) and disk assay using B. subtilis PCI 219 and E. coli K-12 A 20665. Each fraction was evaporated in vacuo and lyophilized.

| Fraction | Tube No. | $NH_4OH$ | Weight | Identity |
| --- | --- | --- | --- | --- |
| 1 | 51–52 | 0.3 N | 130 mg(8%) | neomycin C |
| 2 | 58–61 | 0.3 N | 482 mg(24%) | BB-K 119, the desired compound |
| 3 | 65–70 | 0.3 N | 136 mg(7%) | BB-K 120, position isomer |

Physico-chemical data:

| Code No. | Mp(dec) | IR (KBr) C=O | Rf (S-110, ninhydrin) |
| --- | --- | --- | --- |
| BB-K 119 | 194–196°C | 1640 cm$^{-1}$ | 0.31 |
| BB-K 120 | 185–187°C | 1640 cm$^{-1}$ | 0.25 |

Microanalysis:
BB-K 119: Calcd for $C_{26}H_{51}N_7O_{15} \cdot H_2CO_3$:
C,42.46; H, 6.99; N, 12.84.
Found: C, 42.53; H, 7.03; N, 12.42

BB-K 120: Calcd for $C_{26}H_{51}N_7O_{15} \cdot 2H_2CO_3$:
C, 40.73; H, 6.71; N, 11.87
Found: C, 40.71; H, 6.73; N, 12.08.

BB-K 119 and BB-K 120 gave neomycin C and β-amino-α-hydroxypropionic acid by hydrolysis with 0.5 N NaOH.

EXAMPLE 16

Preparation of L-δ-Benzyloxycarbonylamino-α-hydroxyvaleric acid (VIc)

To a stirred solution of 400 mg (3.0 m moles) of L-δ-amino-α-hydroxyvaleric acid* and 250 mg (6.5 m moles) of sodium hydroxide in 25 ml of water was added dropwise 580 mg (3.3 m moles) of carbobenzoxy chloride over a period of 30 minutes at 0–5°C. The mixture was stirred for an hour at 5–15°C, washed with 25 ml of ether, adjusted to pH 2 with hydrochloric acid and extracted with three 30-ml portions of ether. The combined ethereal solution was shaken with 10 ml of a saturated sodium chloride solution, dried over anhydrous sodium sulfate and evaporated in vacuo to give crystals which were recrystallized from benzene to yield 631 mg (78%) of VIc, mp 110°–111°C.; infrared spectrum [IR(KBr)]: 3460, 3350, 1725, 1685, 1535, 1280, 730, 690cm$^{-1}$. Nuclear magnetic resonance spectrum [NMR(acetone-d$_6$)]δ (in ppm) 1.70 (4H, m) 4.14 (2H, q, J=4.5Hz), 4.19(1H, m), 4.82(2H, s), 6.2(3H, broad), 7.25 (5H, s). [α]$_D^{25}$+ 1.6 (c 10, MeOH), Anal. Calc'd for C$_{13}$H$_{17}$NO$_5$: C. 58.42; H. 6.41; N, 5.24.

Found: C, 58.36; H, 6.50; N, 5.27.

(*S. Ohshiro et al., Yakugaku Zasshi, 87, 1184 (1967).)

EXAMPLE 17

N-Hydroxysuccinimide ester of L-δ-benzyloxycarbonylamino-α-hydroxyvaleric acid (VIIc)

To a stirred and chilled solution of 535 mg (2.0 m moles) of VIc and 230 mg (2.0 m moles) of N-hydroxysuccinimide in 55 ml of ethyl acetate was added 412 mg (2.0 m moles) of N, N'-dicyclohexylcarbodiimide (DCC). The mixture was stirred for 3 hours at room temperature and filtered to remove precipitated N, N'-dicyclohexylurea. The filtrate was evaporated in vacuo to yield 780 mg (100%) of viscous syrup (VIIc). IR(Neat): $\gamma_{C=O}$1810, 1785, 1725 cm$^{-1}$.

EXAMPLE 18

Preparation of 1-N-[L(−)-δ-Amino-α-hydroxyvaleryl]neomycin B, (IVf, BB-K 113)

To a stirred solution of 2.7 g (3.0 m moles) of 6', 6'''-N-dibenzyloxycarbonylneomycin B (IIb) in 40 ml of 25% aqueous THF prepared from 724 mg (2.7 m moles) of L-δ-benzyloxycarbonylamino-α-hydroxyvaleric acid. The reaction mixture was stirred for 4 hours at room temperature and then hydrogenated overnight with 1.1 g of 10% palladium on charcoal in a Parr hydrogenator at 45 psi and room temperature. The catalyst was filtered off and washed with water. The filtrate and washings were combined and evaporated in vacuo to remove most of the organic solvent. The resultant aqueous solution was adsorbed on a column of Amberlite CG-50(NH$_4^+$, 55 ml), which was irrigated successively with 200 ml of water, 200 ml of 0.1 N, 900 ml of 0.3 N, 1.9 L of 0.5 N and 2 L of 1.0 N NH$_4$OH. The eluate was collected in 20-ml fraction from tube nos 1 to 20, then in 15-ml fraction and cut into the following appropriate fractions on the bases of TLC on a silica gel plate (S-110, ninhydrin) and disk assay by use of *B. subtilis* PCI 219 and *P. aeruginosa* A 9843.

| Fraction | Tube No. | NH$_4$OH | | Weight | Identification |
|---|---|---|---|---|---|
| 1 | 50–68 | 0.3 | N | 806 mg(30%) | neomycin B |
| 2 | 127–136 | 0.5 | N | 41 mg(2%) | BB-K 111, a position isomer |
| 3 | 146–164 | 0.5 | N | 42 mg(2%) | BB-K 112, a position isomer |
| 4 | 234–271 | 0.5 | N | 243 mg(11%) | BB-K 113, the desired compound |
| 5 | 300–311 | 1.0 | N | 366 mg(15%) | BB-K 114, diacylated compound |
| 6 | 340–365 | 1.0 | N | 49 mg(2%) | BB-K 115, diacylated compound |

Physico-chemical data:

| Code No. | Mp (dec) | IR(KBr):γC=O | Rf S-110 |
|---|---|---|---|
| BB-K 111 | 184–186°C | 1640 cm$^{-1}$ | 0.35 |
| BB-K 112 | 195–197°C | 1640 cm$^{-1}$ | 0.35 |
| BB-K 113 | 190–197°C | 1640 cm$^{-1}$ | 0.30 |
| BB-K 114 | 191–193°C | 1640 cm$^{-1}$ | 0.28 |
| BB-K 115 | 192–194°C | 1640 cm$^{-1}$ | 0.20 |

Microanalyses:
Calc'd for C$_{28}$H$_{55}$N$_7$O$_{15}$·2H$_2$CO$_3$: C, 42.20; H, 6.97; N, 11.48.
BB-K 111: Found: C, 42.02; H, 6.95; N, 11.04.
BB-K 112: Found: C, 42.49; H, 6.78; N, 11.14.
BB-K 113: Found: C, 42.50; H, 6.67; N, 11.21.
Calc'd for C$_{33}$H$_{64}$N$_8$O$_{17}$·3/2H$_2$CO$_3$: C, 44.18; H, 7.20; N, 11.95.
BB-K 114: Found: C, 44.08; H, 7.19; N, 12.01.
Calc'd for C$_{33}$H$_{64}$N$_8$O$_{17}$·2H$_2$CO$_3$·H$_2$O: C, 42.59; H, 7.15; N, 11.35.
BB-K 115: Found: 42.53; H, 6.99; N, 11.19.

All these BB-K compounds gave neomycin B and δ-amino-α-hydroxyvaleric acid on hydrolysis with 0.5 N NaOH at 100°C for 1 hour.

EXAMPLE 19

Preparation of 1-N-[L(−)-δ-Amino-α-hydroxyvaleryl]neomycin C (IVg, BB-K 132)

To a stirred solution of 2.7 g (3 m moles) of 6', 6'''-N-dibenzyloxycarbonylneomycin C (IIc) in 60 ml of 33% aqueous THF was added a solution of the activated ester (VIIc) in 20 ml of THF which was prepared from 724 mg (2.7 m moles) of L-δ-benzyloxycarbonylamino-α-hydroxyvaleric acid. The mixture was stirred overnight at room temperature and then hydrogenated overnight with 1.1 g of 10% palladium on charcoal in a Parr hydrogenator at 45 psi and room temperature. The catalyst was removed by filtration and washed with water. The filtrate and washings were evaporated in vacuo to remove most of the organic solvent. The resulting aqueous solution was passed through a column of amberlite CG-50 (NH$_4^+$, 55 ml), which was irrigated successively with 120 ml of water, 260 ml of 0.1 N, 1.3 L of 0.3 N, 800 ml of 0.5 N and finally 1 L of 1.0 N NH$_4$OH. The eluate was collected in 20-ml fraction and cut into the following appropriate fractions on the bases of TLC on silica gel plate (S-110, ninhydrin) and disk assay using *B. subtilis* PCI 219 and *E. coli* K-12 A20665. Each fraction was evaporated in vacuo and lyophilized.

| Fraction | Tube No. | NH₄OH | Weight | Identity |
|---|---|---|---|---|
| 1 | 32-42 | 0.3 N | 474 mg(26%) | neomycin C |
| 2 | 70-81 | 0.3 N | 54 mg(3%) | BB-K 130, position isomer |
| 3 | 85-91 | 0.5 N | 47 mg(2%) | BB-K 131, position isomer |
| 4 | 100-118 | 0.5 N | 194 mg(10%) | BB-K 132, the desired compound |
| 5 | 127-130 | 1.0 N | 178 mg(9%) | BB-K 133, diacylated compound |
| 6 | 147-159 | 1.0 N | 49 mg | crude BB-K 134 diacylated compound |

Rechromatography of fraction 6 (49 mg) on amberlite CG-50 (NH₄⁺, 5 ml) afforded 26 mg (14%) of BB-K 134.

Physico-chemical data:

| Code No. | Mp(dec) | IR (KBr):γC=O | Rf (S-110, ninhydrin) |
|---|---|---|---|
| BB-K 130 | 201-202°C | 1640 cm⁻¹ | 0.18 |
| BB-K 131 | 190-202°C | 1640 cm⁻¹ | 0.17 |
| BB-K 132 | 195-196°C | 1640 cm⁻¹ | 0.15 |
| BB-K 133 | 201-202°C | 1640 cm⁻¹ | 0.11 |
| BB-K 134 | 189-190°C | 1640 cm⁻¹ | 0.07 |

Microanalyses:
Calc'd for $C_{28}H_{55}N_7O_{15} \cdot 5/2 H_2CO_3$: C, 41.40; H, 6.83; N, 11.08.
BB-K 130: Found: C, 41.33; H, 6.59; N, 10.94.
BB-K 131: Found: C, 40.84; H, 6.58; N, 10.82.
Calc'd for $C_{28}H_{55}N_7O_{15} \cdot 3/2 H_2CO_3 \cdot \frac{1}{2}H_2O$: C, 42.59 H, 7.15; N, 11.79.
BB-K 132: Found: C, 42.75; H, 6.97; N, 11.60.
Calc'd for $C_{33}H_{64}N_8O_{17} \cdot 2H_2CO_3 \cdot H_2O$: C, 42.59; H, 7.15; N, 11.35.
BB-K 133: Found: C, 42.64; H, 7.08; N, 11.60.
BB-K 134: Found: C, 42.48; H, 6.60; N, 10.82.

All these BB-K compounds gave neomycin C and δ-amino-α-hydroxyvaleric acid on hydrolysis with 0.5 N NaOH. BB-K 133 and BB-K 134 are assumed to be diacylated compounds on the basis of slow mobilities on silica gel plate and amberlite CG-50 column.

Amberlite CG-50 is the tradename for the chromatographic grade of a weakly acidic cationic exchange resin of a carboxylic-polymethacrylic type.

Amberlite IR-120 is the tradename for a high density nuclear sulfonic acid type cationic exchange resin supplied in either hydrogen or sodium form as beads—1-5-50 mesh.

We claim:

1. A compound having the formula

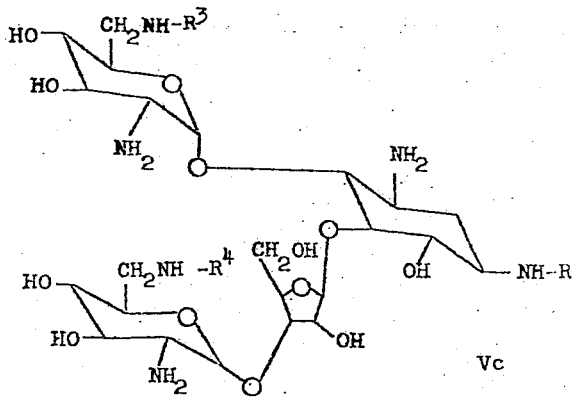

Vc or

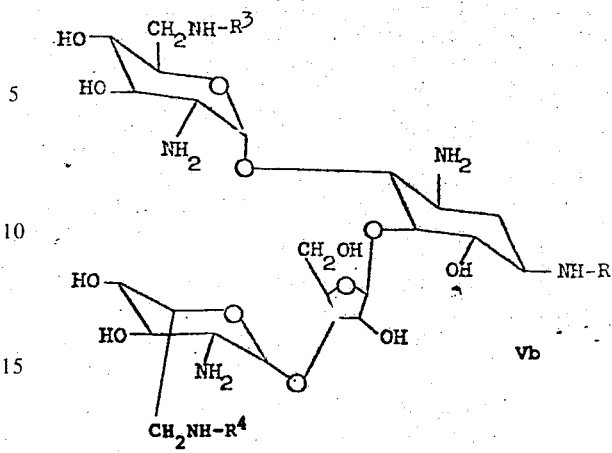

Vb wherein both $R^3$ and $R^4$ are H or

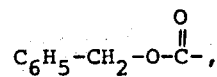

R is H, L-(−)-γ-amino-α-hydroxybutyryl, L-(−)-β-amino-α-hydroxypropionyl, L-(−)-δ-amino-α-hydroxyvaleryl, L-(−)-γ-benzyloxycarbonylamino-α-hydroxybutyryl, L-(−)-β-benzyloxycarbonyl-amino-α-hydroxypropionyl, or L-(−)-δ-benzyloxycarbonylamino-α-hydroxyvaleryl, wherein $R^3$ and $R^4$ or R must be other than H; or a non-toxic pharmaceutically acceptable acid addition salt thereof.

2. A compound of claim 1 having the formula

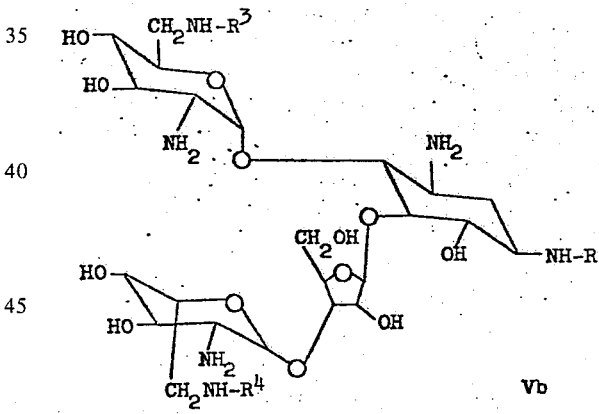

Vb wherein both $R^3$ and $R^4$ are H or

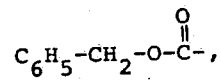

R is H, L-(−)-γ-amino-α-hydroxybutyryl, L-(−)-β-amino-α-hydroxypropionyl, L-(−)-δ-amino-α-hydroxyvaleryl, L-(−)-γ-benzyloxycarbonylamino-α-hydroxybutyryl, L-(−)-β-benzyloxycarbonyl-amino-α-hydroxypropionyl, or L-(−)-δ-benzyloxycarbonylamino-α-hydroxyvaleryl, wherein $R^3$ and $R^4$ or R must be other than H; or a nontoxic pharmaceutically acceptable acid addition salt thereof.

3. The compound of claim 2 wherein $R^3$ and $R^4$ are

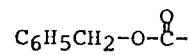

and R is L-(−)-γ-benzyloxycarbonylamino-α-hydroxybutyryl,

4. The compound of claim 2 wherein $R^3$ and $R^4$ are H and R is L-(−)-γ-amino-α-hydroxybutyryl, L-(−)-β-amino-α-hydroxypropionyl or L-(−)-δ-amino-α-hydroxyvaleryl; or a nontoxic pharmaceutically acid addition salt thereof.

5. The compound of claim 4 wherein $R^3$ and $R^4$ are H and R is L-(−)-γ-amino-α-hydroxybutyryl; or the mono- or disulfate salt thereof.

6. The compound of claim 4 wherein $R^3$ and $R^4$ are H and R is L-(−)-β-amino-α-hydroxypropionyl; or the mono- or disulfate salt thereof.

7. The compound of claim 4 wherein $R^3$ and $R^4$ are H and R is L-(−)-δ-amino-α-hydroxyvaleryl; or the mono- or disulfate salt thereof.

8. The compound of claim 1 having the formula

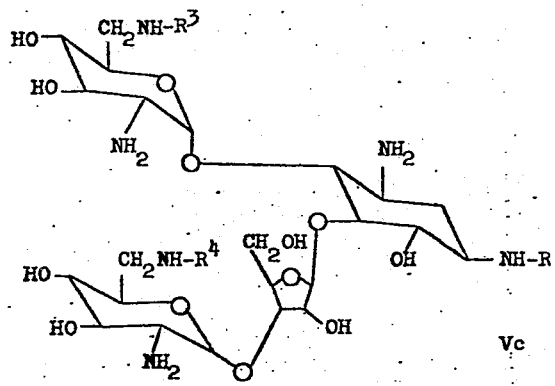

wherein both $R^3$ and $R^4$ are H or

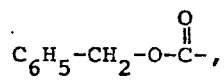

R is H, L-(−)-γ-amino-α-hydroxybutyryl, L-(−)-β-amino-α-hydroxypropionyl, L-(−)-δ-amino-α-hydroxyvaleryl, L-(−)-γ-benzyloxycarbonylamino-α-hydroxybutyryl, L-(−)-β-benzyloxycarbonylamino-α-hydroxypropionyl, or L-(−)-δ-benzyloxycarbonylamino-α-hydroxyvaleryl, wherein $R^3$ and $R^4$ or R must be other than H; or a nontoxic pharmaceutically acceptable acid addition salt thereof.

9. The compound of claim 8 wherein $R^3$ and $R^4$ are

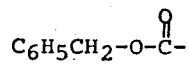

and R is L-(−)-γ-benzyloxycarbonylamino-α-hydroxybutyryl, L-(−)-β-benzyloxycarbonylamino-α-hydroxypropionyl or L-(−)-δ-benzyloxycarbonylamino-α-hydroxyvaleryl.

10. The compound of claim 8 wherein $R^3$ and $R^4$ are H and R is L-(−)-γ-amino-α-hydroxybutyryl, L-(−)-β-amino-α-hydroxypropionyl or L-(−)-δ-amino-α-hydroxyvaleryl; or a nontoxic pharmaceutically acid addition salt thereof.

11. The compound of claim 8 wherein $R^3$ and $R^4$ are H and R is L-(−)-γ-amino-α-hydroxybutyryl; or the mono- or disulfate salt thereof.

12. The compound of claim 8 wherein $R^3$ and $R^4$ are H and R is L-(−)-β-amino-α-hydroxypropionyl; or the mono- or disulfate salt thereof.

13. The compound of claim 8 wherein $R^3$ and $R^4$ are H and R is L-(−)-δ-amino-α-hydroxyvaleryl; or the mono- disulfate salt thereof.

* * * * *